(12) United States Patent
Servin et al.

(10) Patent No.: US 10,821,940 B2
(45) Date of Patent: Nov. 3, 2020

(54) WHEEL FOR A VEHICLE WINDOW WIPER DRIVE SYSTEM

(71) Applicant: Valeo Systèmes d'Essuyage, Le Mesnil Saint Denis (FR)

(72) Inventors: Alain Servin, Villiers (FR); Laurent Collinet, La Roche Posay (FR); Stephane Beauchamps, Bruxerolles (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 190 days.

(21) Appl. No.: 15/451,592

(22) Filed: Mar. 7, 2017

(65) Prior Publication Data
US 2017/0253217 A1    Sep. 7, 2017

(30) Foreign Application Priority Data
Mar. 7, 2016 (FR) ...................................... 16 51867

(51) Int. Cl.
*B60S 1/26* (2006.01)
*H01H 19/58* (2006.01)
(Continued)

(52) U.S. Cl.
CPC . *B60S 1/26* (2013.01); *B60S 1/08* (2013.01); *B60S 1/0803* (2013.01); *B60S 1/166* (2013.01);
(Continued)

(58) Field of Classification Search
CPC .. B60S 1/16; B60S 1/163; B60S 1/166; B60S 1/26; B60S 1/08; B60S 1/0803;
(Continued)

(56) References Cited

U.S. PATENT DOCUMENTS

| 3,059,264 A | * | 10/1962 | Ziegler | ..................... | B60S 1/08 |
| | | | | | 15/250.17 |
| 3,169,266 A | * | 2/1965 | Crawford | .................. | B60S 1/08 |
| | | | | | 15/250.17 |

(Continued)

FOREIGN PATENT DOCUMENTS

| CN | 101026046 A | 8/2007 |
| CN | 201863804 U | 6/2011 |

(Continued)

OTHER PUBLICATIONS

Machine translation of description portion of WO publication WO 03/032348, published Apr. 17, 2003. (Year: 2003).*

(Continued)

*Primary Examiner* — Gary K. Graham
(74) *Attorney, Agent, or Firm* — Osha Liang LLP

(57) ABSTRACT

Wheel (100) for a vehicle window wiper drive system, said wheel comprising electrical contact means (400), a first and a second electrical contact means (410, 411) of said electrical contact means being in electrical continuity, and the first and the second electrical contact means being for a respective slider (200a, 200b), said wheel being characterized in that the angular extension (α) of said electrical contact means in the plane of the wheel is strictly less than 360° and said electrical contact means being situated on a face of the wheel intended to receive a linkage.

16 Claims, 4 Drawing Sheets

Figure 1:
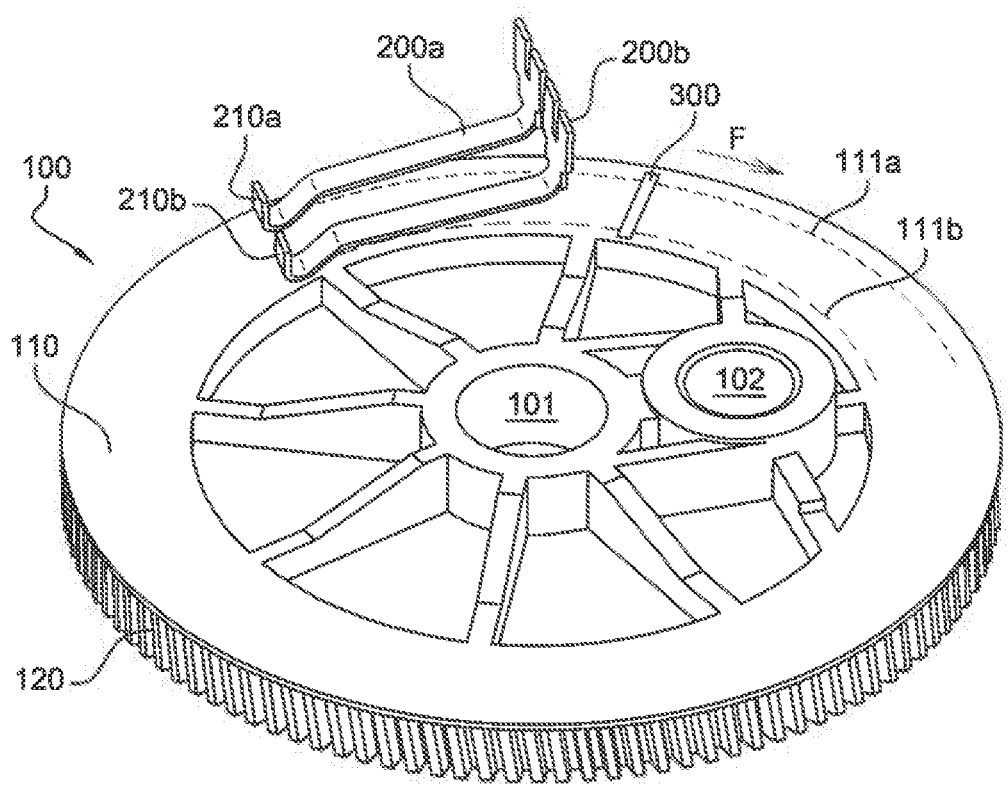

(51) Int. Cl.
*B60S 1/16* (2006.01)
*B60S 1/08* (2006.01)
*H01H 1/40* (2006.01)
*H02K 11/21* (2016.01)

(52) U.S. Cl.
CPC ............ *H01H 19/585* (2013.01); *H01H 1/40* (2013.01); *H02K 11/21* (2016.01)

(58) Field of Classification Search
CPC ...... B60S 1/0814; H02K 17/30; H02K 23/66; H02K 11/21; H01H 19/585; H01H 1/40; Y10S 318/02
USPC ......... 15/250.3, 250.12, 250.17; 318/DIG. 2, 318/443, 444; 200/19.2, 6 R, 11 R; 310/69, 71, 83
See application file for complete search history.

(56) References Cited

U.S. PATENT DOCUMENTS

| | | | | |
|---|---|---|---|---|
| 3,261,946 | A | * | 7/1966 | Diello ........................ B60S 1/08 335/74 |
| 4,514,669 | A | * | 4/1985 | Ecole ........................ B60S 1/08 318/443 |
| 4,559,484 | A | * | 12/1985 | Hirano ...................... B60S 1/08 15/250.17 |
| 4,585,980 | A | * | 4/1986 | Gille ..................... B60S 1/0814 15/250.16 |
| 4,599,546 | A | * | 7/1986 | Uemura .................... B60S 1/08 318/286 |
| 4,689,535 | A | * | 8/1987 | Tsunoda .................. B60S 1/185 15/250.17 |
| 5,998,949 | A | * | 12/1999 | Amagasa ................. B60S 1/08 318/266 |
| 6,255,605 | B1 | | 7/2001 | Leiter et al. |
| 2007/0193861 | A1 | | 8/2007 | Yamasaki et al. |
| 2013/0049499 | A1 | | 2/2013 | Yamaki et al. |

FOREIGN PATENT DOCUMENTS

| | | |
|---|---|---|
| CN | 102656063 A | 9/2012 |
| CN | 102738966 A | 10/2012 |
| CN | 103987587 A | 8/2014 |
| EP | 0533052 A1 | 3/1993 |
| FR | 2830672 A1 | 4/2003 |
| FR | 2830673 A1 | 4/2003 |
| JP | 11-20619 * | 1/1999 |
| WO | 03032348 A1 | 4/2003 |
| WO | 2012171923 A1 | 12/2012 |

OTHER PUBLICATIONS

Preliminary Report Issued in Corresponding French Application No. 1651867; dated Dec. 5, 2016 (8 Pages).
First Office Action in corresponding Chinese Application No. 201710303641.8, dated Dec. 4, 2018 (13 pages).
Third Office Action in corresponding Chinese Application No. 201710303641.8, dated Oct. 21, 2019 (13 pages).

* cited by examiner

WHEEL FOR A VEHICLE WINDOW WIPER DRIVE SYSTEM

The invention concerns a wheel for a window wiper drive mechanism, for example for a vehicle rear window wiper, a housing enclosing such a mechanism, and a window wiper drive system comprising such a motor and such a housing.

Window wiper systems, in particular those fitted to motor vehicles, comprise a system for controlling the reciprocating movement of the wiper blade with a motor. In certain cases, for example in the case of a rear window wiper, the system also comprises a linkage arrangement for transforming the rotating movement of the motor into a reciprocating movement of the wiper blade.

Also, such a system must comprise a device allowing the wiper to return to a rest position when the user stops the operation of the wiper mechanism. In fact this interruption may occur at any position of the wiper blade on the glass, while it must necessarily return to its rest position before stopping definitively.

To this end, devices are known which comprise a rotary switch mounted on a wheel fixed to the motor and installed in parallel with the wiper control switch. Thus the motor continues to be powered until the rotary switch detects a rest position of the wiper blade and switches off the motor power (e.g. FR 2 830 672 and FR 2 830 673). Another switch may intervene to short-circuit the motor and thus stop it immediately in order to avoid the inertia effect.

Such switches generally comprise a metallic annular cam mounted on a wheel driven by the motor, and contact elements (or sliders) which each slide on a track, continuous or not, of this cam.

Because of the presence of the linkage elements and the bulkiness of the sliders, the latter together with the cam are generally situated on the face of the wheel opposite the linkage elements. Therefore the housing (referred to below as the reduction gear housing) containing the wheel, the linkage elements and the sliders is relatively large.

Also, the presence on board motor vehicles of controllers of all the electrical functions of the vehicle, known as body controllers, has modified the design of the devices for setting the wiper blades to the rest position. In fact the motor is now controlled directly by the controller and no longer by a rotary switch. It is sufficient for the controller to receive information on the position of the wiper blade on the window, which enables it to manage its stoppage in the rest position. This information need not be continuous; it is sufficient to have intermittent information, for example a voltage peak (top) at the moment when the wiper blade approaches its rest position.

The invention aims to benefit from the presence of a controller in the vehicle to reduce the volume of the reduction gear housing and to make material savings.

To this end, the invention proposes a wheel for a vehicle window wiper drive system, characterized in that it comprises, on a face of the wheel intended to receive a linkage, a first and a second electrical contact means for a respective slider, said electrical contact means being in electrical continuity, and in that the angular extension of said electrical contact means in the plane of the wheel is strictly less than 360°.

In the invention, the electrical contact means are situated on the face of the wheel intended to carry the linkage, and they have a limited angular extension in the plane of the wheel. In any case, the presence of the linkage on this face of the wheel greatly restricts the installation of the electrical contact means and sliders. Such a linkage is found for example on rear window wiper systems.

Thus space is saved and material is saved.

The electrical contact means comprise at least a first and a second electrical contact means.

The wheel is generally made of a non-conductive material, for example plastic material, and is produced by moulding.

The electrical contact means may be fixed to the non-conductive material by any known, notably by over moulding, gluing, hot plastic riveting etc.

The sliders are intended, in operation, to slide over the wheel and in particular over the electrical contact means in one angular position of the wheel. When the sliders pass over the electrical contact means, because these contact means are connected by a conductor, they close the contact between the sliders and send a current or voltage peak to the controller. This current or voltage peak gives the controller information on the angular position of the wheel.

Advantageously, the angular extension of the electrical contact means in the plane of the wheel is less than 180° preferably less than 90°, or even less than 45°.

The invention proposes several embodiments for the electrical contact means, in particular the first and second electrical contact means:

they may be combined and form a single conductive stud; in this case, the angular extension is that of the stud and may be very small, in particular if this stud takes the form of a bar arranged radially;

they may be not combined and each comprise a stud connected by a conductor; such studs may take the form of metal bars or plates of small dimensions, connected by a conductive wire or metal track;

the wheel may comprise an electrically conductive segment in the form of a circle arc, forming the first contact means, said circle arc segment comprising a radial protrusion, the radial protrusion forming the second electrical contact means; in this case, the first and second contact means form a "mini-cam", i.e. a cam of limited angular extension in the plane of the wheel, strictly less than 360°, for example close to 90°; the conductor connecting the two electrical contact means is the circle arc segment itself.

Advantageously, the face of the wheel may comprise a first track and a second track for a respective slider, the first track being partly formed by the circle arc segment and the second track being partly formed by the protrusion.

The sliders are intended, in operation, to slide over the face of the wheel intended to receive the linkage and the contact means. Irrespective of the shape of the electrical contact means, it is advantageous to provide tracks on this face of the wheel which are specially designed to allow the sliders to slide without damaging the wheel. In the case where the electrical contact means comprise a circle arc segment, the segment itself may form a part of the first track for a first slider, the extension forming a part of the second track for a second slider.

There is therefore an angular sector in which the second slider slides over the non-conductive material of the wheel but close to the annular segment, which may pose problems of undesirable short-circuit between the sliders.

Advantageously, the circle arc segment may extend along a circular rib provided on the face of the wheel, said circular rib being intended to isolate the sliders electrically when they slide over a respective track of the wheel.

This rib, for example composed of the same non-conductive material as the wheel, allows the sliders to be isolated from each other when sliding on their respective tracks.

Advantageously, the rib may comprise an interruption, the protrusion at least partially occupying said interruption.

Advantageously, the rib may carry one of the tracks.

In this case, the two sliders, in operation, are offset in an axial direction, thus avoiding undesirable short-circuits.

Advantageously, the face of the wheel may comprise a first track and a second track for a respective slider, the first track being partly formed by the circle arc segment and the second track being partly formed by the protrusion, so as to facilitate the "rise" and/or "fall" of the slider on the raised track relative to the plane of the wheel.

Alternatively, the rib may extend between the first and second tracks.

In this case, the two sliders are, in operation, separated by a rib which may be narrower than in the previous embodiment.

The invention also comprises a reduction gear housing for a vehicle window wiper drive system comprising a wheel according to the invention, for example a rear window wiper drive system.

Advantageously, the housing may comprise a cover, the inner face of said cover comprising a first and a second electrically conductive slider, one end of the first slider being intended to come into contact with the first electrical contact and one end of the second slider being intended to come into contact with the second electrical contact in one position of the wheel and when the cover is closed.

Advantageously, the radial position of the end of the first slider may be identical to that of the first electrical contact, and the radial position of the end of the second slider may be identical to that of the second electrical contact, and the angular sector contained between the ends of the first and second sliders may be equal to the angular sector contained between the first and second electrical contacts.

The invention also concerns a drive system for a vehicle window wiper, comprising a motor and a reduction gear housing as described above.

The invention also concerns a system for wiping a vehicle window, comprising such a drive system and at least one wiper blade.

Figure 2:
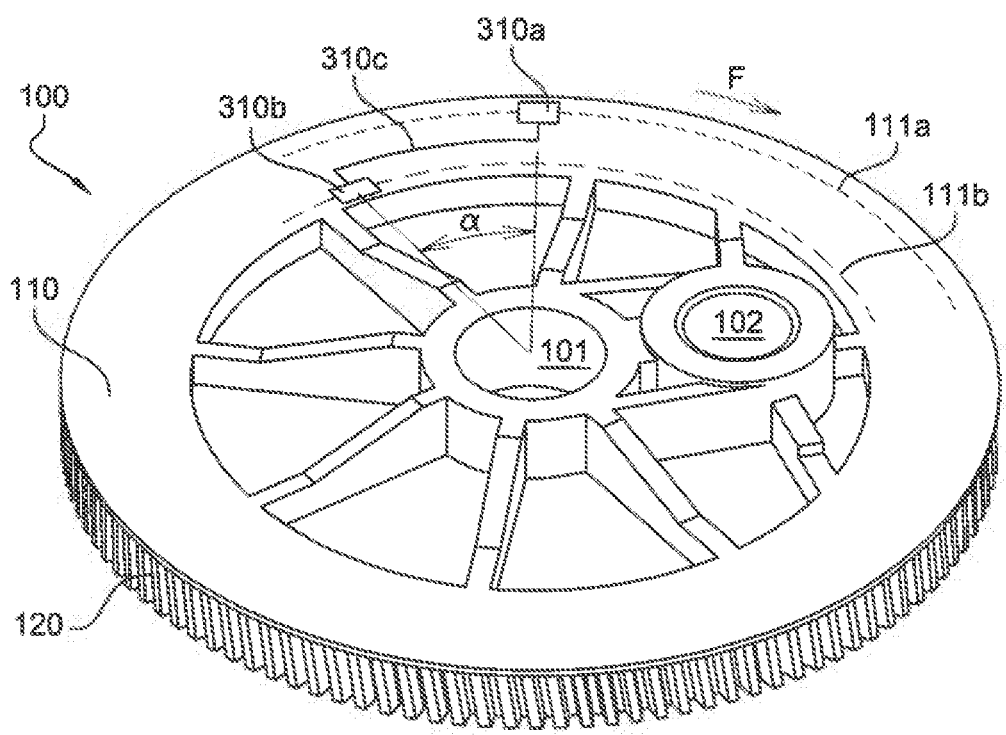
Figure 3:
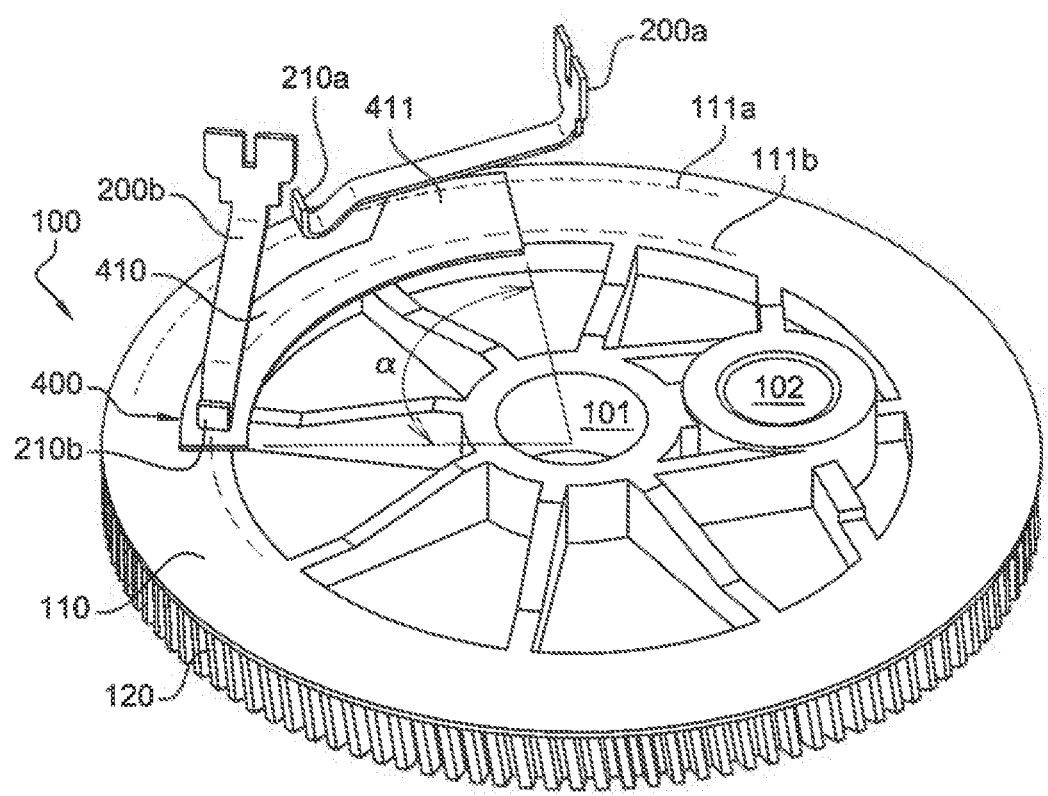
Figure 4:
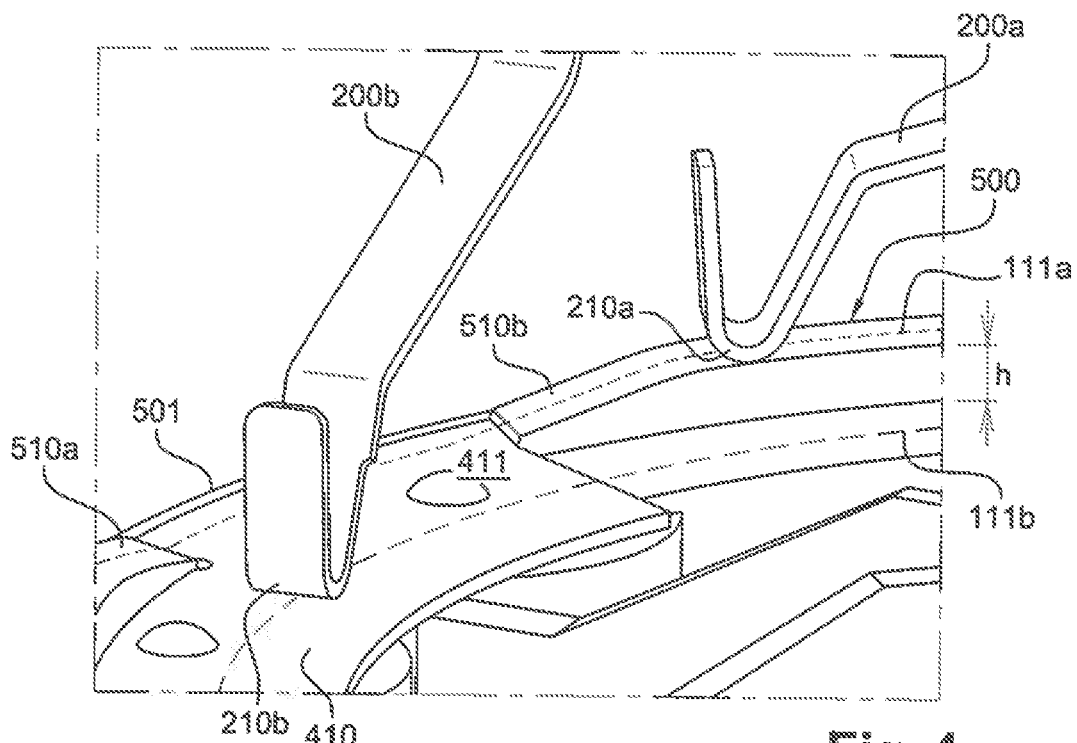
Figure 5A:
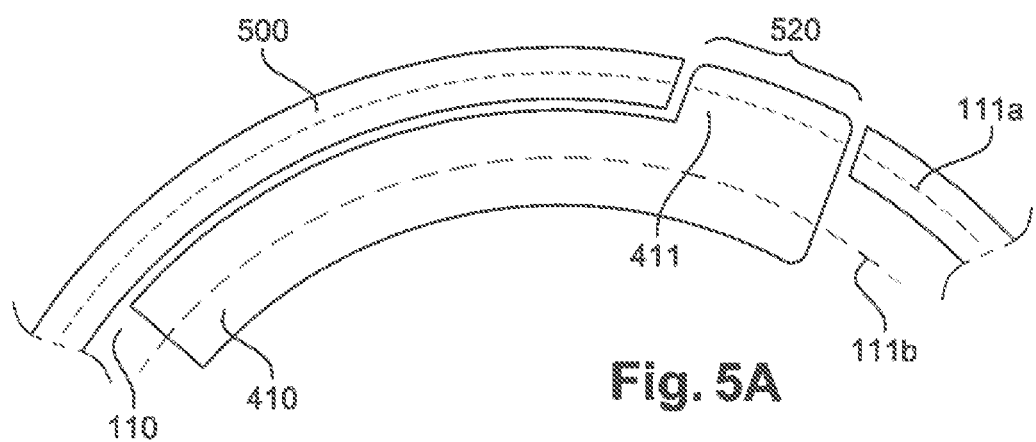
Figure 5B:
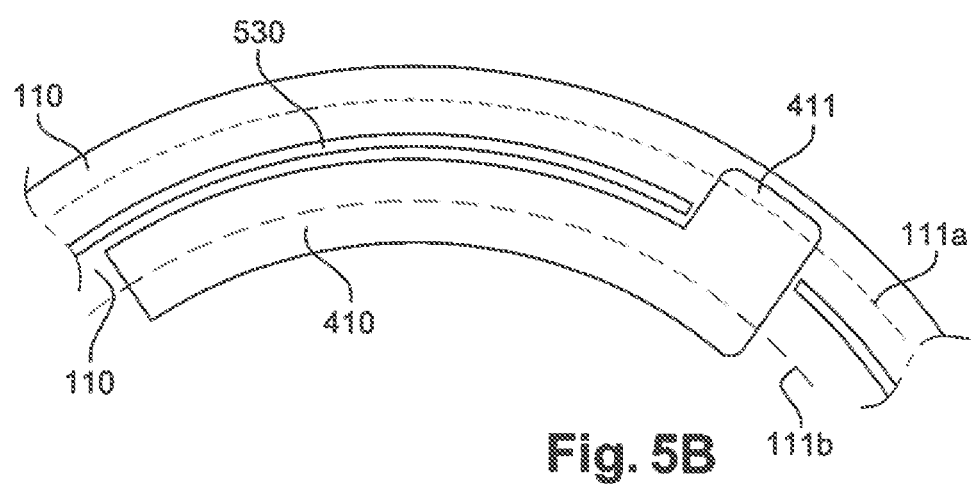
Figure 5C:
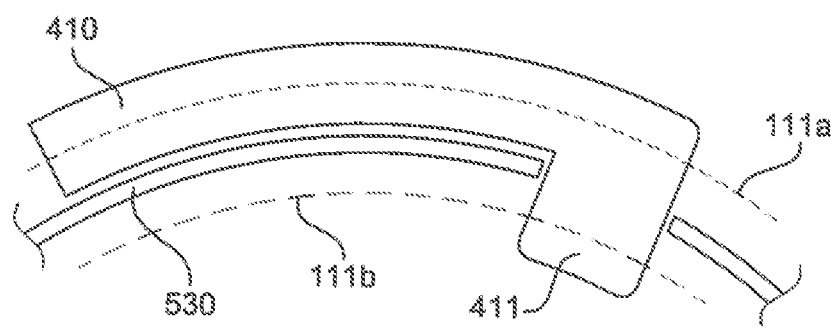
Figure 6:
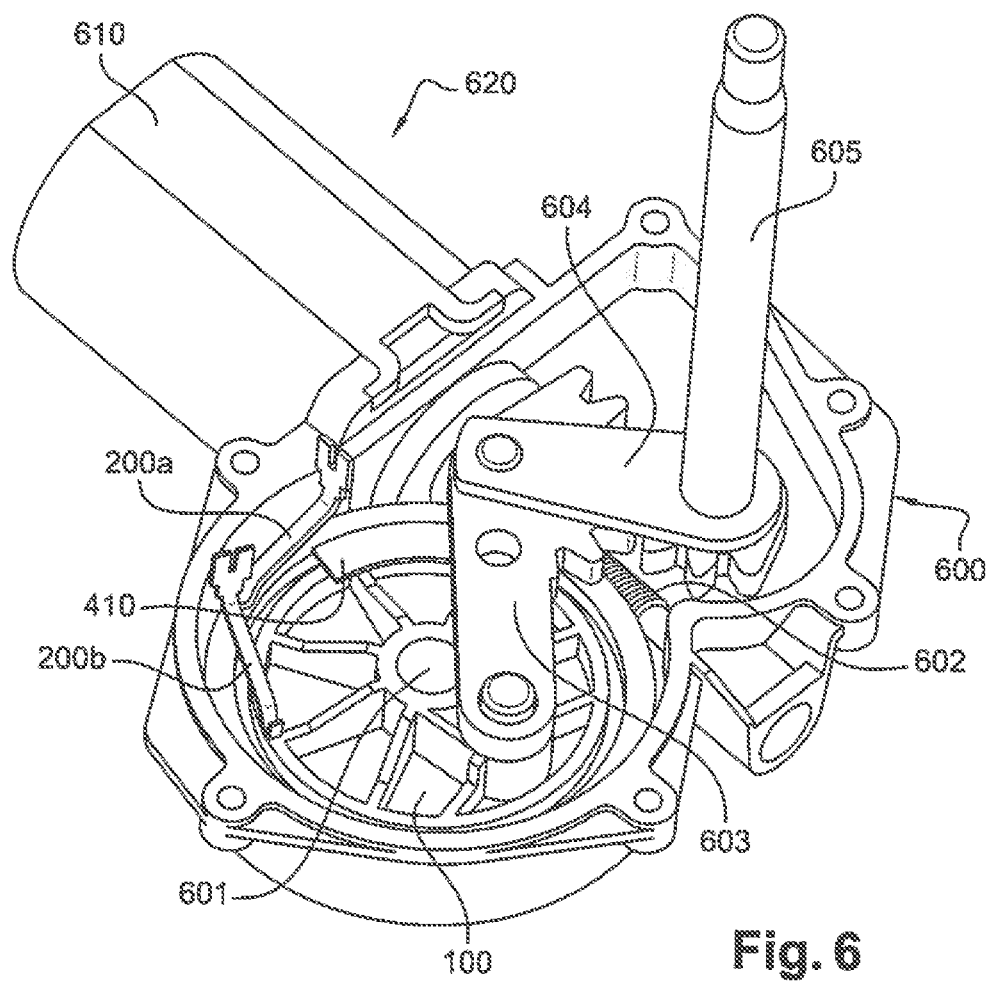
Figure 7:
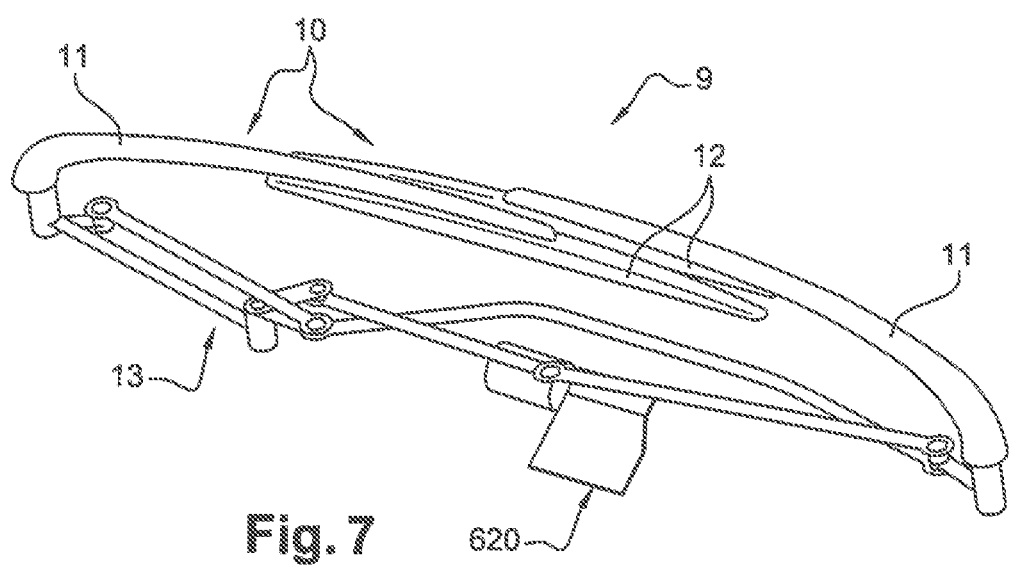

Embodiments and variants are described below as non-limitative examples, with reference to the attached drawings in which:

FIG. 1 shows in perspective a wheel for a vehicle window wiper drive system comprising a single stud, FIG. 2 shows in perspective the wheel comprising two studs with an angular offset, FIG. 3 shows in perspective the wheel comprising an annular segment with a protuberance, FIG. 4 shows in perspective an enlarged view of the slider contact zone, illustrating an embodiment with a rib, FIGS. 5A to 5C show diagrammatically three embodiments of the annular segment and of a rib in plan view, FIG. 6 shows in perspective a vehicle window wiper drive system comprising a motor and a reducing gear housing, with the cover of the reducing gear housing removed, and FIG. 7 is a diagrammatic, perspective view of a system for wiping a vehicle window using the window wiper drive system in FIG. 6.

FIG. 1 illustrates a wheel 100 for a vehicle window wiper drive system, comprising an axial hub 101 and an eccentric housing 102 for a connecting rod, and able to be driven in the direction of arrow F. To this end, it comprises teeth or notches 120 on its periphery in order to be driven by engagement, but it could also be driven by any other means.

A first and a second slider 200a, 200b are also shown which are not integral with the wheel but are useful for understanding of the invention. The ends 210a, 210b of the sliders are intended, in operation, to slide over an annular portion 110 of the wheel, situated on the edge of the wheel 100 in the example of FIG. 1. This annular portion 110 in fact forms a first and a second track 111a, 111b for a respective slider 200a, 200b, shown in parallel, the first track 111a being the outer track and indicated (partially) in short dashes, the second track 111b being the inner track and indicated (partially) in long dashes. The wheel 100 is made of non-conductive material, such that the circuit between the sliders is open when they are sliding over their respective tracks.

The wheel here illustrated has electrical contact means comprising a first and a second electrical contact means that are combined and form a single conductive stud 300. The annular portion 110 comprises an electrically conductive stud 300, for example metallic, forming an electrical contact means and arranged so as to cover the first and second tracks. When, during rotation of the wheel 100, the ends 210a, 210b pass over the stud 300, this short-circuits the first and second sliders and creates a pulse or top for a controller placed further downstream and not shown. This pulse gives the controller information on the angular position of the wheel and hence of the wiper arm.

In the example of FIG. 1, the single stud 300 is arranged radially such that its angular extension is limited to a few degrees. It may be attached to the wheel by any known means (gluing etc.). It may protrude slightly beyond the plane of the annular portion 110 or be housed in a groove on the annular portion 110 so as not to protrude.

One drawback of this embodiment is that the sliders, although not parallel, are very close together, which firstly is not always compatible with the dimensions of the sliders and secondly risks creating undesirable short-circuits between the sliders.

FIG. 2 illustrates a second embodiment of the wheel 100 in which the sliders have been omitted for greater clarity. In this second embodiment, the wheel 100 comprises electrical contact means comprising a first stud 310a that forms a first electrical contact means and a second stud 310b that forms a second electrical contact means. The wheel 100 comprises an annular portion 110 with a first and a second track 111a, 111b. The first track 111a comprises the first stud 310a and the second track comprises the second stud 310b, both electrically conductive and offset angularly but connected by a conductor 310c and fixed to the annular portion by any known means; the conductive wire 310c may for example be housed in a groove provided in the face of the wheel intended to receive a linkage. The studs may consist of bars, contact plates or other. As shown, the first and second studs 310a, 310b are angularly offset by an angle α close to 45°.

In this embodiment, the ends 210a, 210b of the sliders are offset by the same angle α so as to pass simultaneously over a respective stud 310a, 310b during rotation of the wheel 100. As in the first embodiment, the simultaneous passage of the sliders over a respective stud puts the sliders into short-circuit.

FIG. 3 illustrates a third embodiment of the wheel 100. In this embodiment, the electrical contact means 400 comprise a conductive circle arc segment 410 or mini-cam, for example metallic, fixed to the annular portion 110 by any known means (gluing, hot plastic riveting etc.) and forming the first electrical contact means. The circle arc segment 410 comprises a so-called inner edge facing the axis of rotation of the wheel, and a so-called outer edge facing the edge of the wheel. Such a circle arc segment is generally arranged close to the edge of the wheel for better measuring precision.

The circle arc segment 410 comprises a radial protrusion 411 on one edge, here its outer edge, and forming the second electrical contact means. The first track 111a of the first slider 200a comprises the protrusion 411, the second track 111b of the second slider 200b comprises the circle arc segment 410. An electrical contact is created between the first and second sliders when their respective ends slide over the circle arc segment 410 and the protrusion 411.

In this embodiment, the first electrical contact means 410 and the conductor connecting the first and second electrical contact means are combined.

As shown, the angular extension a of the electrical contact means 400, which here corresponds to that of the circle arc segment 410, is close to 90°.

As shown on FIG. 3, there are angular positions of the wheel in which the end 210a of the first slider 200a is very close to the outer edge of the circle arc segment 410, and hence in which there is a risk of undesirable short-circuit between the sliders. The invention proposes several solutions for avoiding this risk.

FIG. 4 illustrates a first variant of the third embodiment. In this variant, the face of the wheel intended to receive a linkage comprises a circular rib 500 which rises from the plane of the wheel, and hence from the annular portion 110, by a height h. It is sufficiently wide to carry the first track 111a on its top. The rib 500 comprises an interruption 501 in which the protrusion 411 of the circle arc segment 410 lies, this protrusion forming part of the first track 111a.

In this way, when it slides over the rib 500, the end 210a of the first slider 200a is axially spaced from the end 210b of the second slider 200b, avoiding the risk of undesirable short-circuit.

In FIG. 4, the rib 500 forms a raised edge of the wheel 100 but it could be arranged at any other location on the face of the wheel.

In order to facilitate the passage of the end 210a of the first slider 200a from the top of the rib 500 to the protrusion 411 and vice versa, each end of the interruption 501 of the rib 500 comprises a ramp 510a, 510b.

This variant is indicated diagrammatically in top view on FIG. 5A.

FIG. 5B illustrates a variant of the third embodiment. In this variant, a narrow rib 530 rises above the annular portion 110 and extends along the outer edge of the circular arc segment 410, the rib and the segment preferably being in contact with each other. The rib therefore extends between the two tracks 111a et 111b.

In operation, the sliders both slide over the annular portion 110 of the wheel 100, and the rib ensures the electrical isolation between the two sliders 200a, 200b. As in the preceding variant, the rib 530 comprises an interruption to allow integration of the protrusion 411 in the first track 111a.

FIG. 5C illustrates another variant of the third embodiment. In this variant, the narrow rib 530 extends along the inner edge of the metallic circle arc segment 410. The rib again extends between the two tracks 111a and 111b and ensures the electrical isolation between the two sliders 200a, 200b. It comprises an interruption to allow integration of the protrusion 411 in the second track 111b.

In the variants of FIGS. 5B and 5C, the rib 530 is spaced apart from the edge of the wheel 100.

In another variant (not shown), the rib 500 is situated along the inner edge of the circle arc segment 410 and then carries the second track 111b.

FIG. 6 shows a drive system 620 for a vehicle window wiper blade comprising a wheel 100 according to the invention. This system comprises a reduction gear housing 600 and a motor 610. The wheel 100 is housed in a space in the housing and mounted so as to rotate about a shaft 601 which is situated in the hub 101. It comprises a circle arc segment 410 according to the third embodiment. The figure also shows the first and second sliders 200a, 200b which are integral with a cover of the housing 610 (not shown for greater clarity). An endless screw 602 driven by the motor 610 engages on the notches 120 of the wheel 100. The housing also comprises a linkage composed of two arms, a first arm 603 mounted so as to rotate in the eccentric housing 102 of the wheel, one end of which arm engages with a toothed wheel integral with a drive rod 605 of a window wiper blade, and a second arm 604 mounted on the first arm 603 so as to rotate around the rod 605.

FIG. 7 shows a wiper system 9, here comprising two wiper blades 10, each comprising a drive arm 11, one end of which is connected to a blade 12 and the other opposite end of which is connected by a linkage or rod systems 13 to an output shaft of the drive system 620, such as that in FIG. 6.

The invention claimed is:

1. A vehicle window wiper drive system comprising:
   a wheel;
   a first slider and a second slider; and
   a linkage,
   wherein the wheel comprises:
   at least two electrical contacts, comprising at least a first and a second electrical contact being in electrical continuity; and
   a first track comprising the first electrical contact and a second track comprising the second electrical contact, wherein the first electrical contact on the first track contacts the first slider and the second electrical contact on the second track contacts the second slider,
   wherein the wheel is formed of a non-conductive material and is configured to rotate about a shaft and receive the linkage,
   wherein an angular extension of all of the at least two electrical contacts in a plane of the wheel is less than 360°, and
   wherein each of the at least two electrical contacts are disposed on a face of the wheel that receives the linkage.

2. The vehicle window wiper drive system according to claim 1, wherein the angular extension of each of the at least two electrical contacts in the plane of the wheel is less than 45°.

3. The vehicle window wiper drive system according to claim 1, wherein the first and second electrical contacts are combined and form a single conductive stud arranged radially.

4. The vehicle window wiper drive system according to claim 1, wherein the first and second electrical contacts each comprise a stud connected by a conductor.

5. The vehicle window wiper drive system according to claim 1, wherein the wheel further comprises an electrically conductive segment in a form of a circle arc segment forming the first electrical contact, said circle arc segment comprising a radial protrusion forming the second electrical contact.

6. The vehicle window wiper drive system according to claim 5, wherein the face of the wheel comprises the first track and the second track, the first track being partly formed by the circle arc segment and the second track being partly formed by the radial protrusion.

7. The vehicle window wiper drive system according to claim 6, wherein the circle arc segment extends along a circular rib provided on the face of the wheel, wherein said circular rib isolates the first slider from the second slider electrically when they slide on a respective track of the wheel.

8. The vehicle window wiper drive system according to claim 7, wherein the circular rib comprises an interruption, the radial protrusion at least partially occupying said interruption.

9. The vehicle window wiper drive system according to claim 7, wherein the circular rib carries one of the first track or the second track.

10. The vehicle window wiper drive system according to claim 9, wherein at least one of an ends of an interruption forms a ramp.

11. The vehicle window wiper drive system according to claim 7, wherein the circular rib extends between the first track and the second track.

12. A reduction gear housing having therein the vehicle window wiper drive system according to claim 1.

13. The reduction gear housing according to claim 12, further comprising a cover, wherein an inner face of said cover comprises the first and the second slider, wherein the first and the second sliders are electrically conductive, and wherein, for one position of the wheel and when the cover is closed, an end of the first slider contacts the first electrical contact and an end of the second slider contacts the second electrical contact.

14. The reduction gear housing according to claim 13, wherein:

a radial position of the end of the first slider is identical to a radial position of the first electrical contact and a radial position of the end of the second slider is identical to a radial position of the second electrical contact, and an angular sector contained between the end of the first slider and the end of the second slider is equal to an angular sector contained between the first and second electrical contacts.

15. A drive system for a vehicle window wiper, comprising a motor and the reduction gear housing according to claim 12.

16. A system for wiping a motor vehicle window, comprising: the drive system according to claim 15; and at least one wiper blade.

* * * * *